United States Patent
Yasuhara et al.

[11] Patent Number: 5,846,448
[45] Date of Patent: Dec. 8, 1998

[54] FERRITE AND FERRITE CORE FOR POWER SUPPLY

[75] Inventors: Katsushi Yasuhara; Takashi Ito; Osamu Takeda; Shoji Inoue, all of Chiba, Japan

[73] Assignee: TDK Corporation, Tokyo, Japan

[21] Appl. No.: 564,265

[22] PCT Filed: Apr. 27, 1994

[86] PCT No.: PCT/JP94/00712

§ 371 Date: Dec. 27, 1995

§ 102(e) Date: Dec. 27, 1995

[87] PCT Pub. No.: WO95/29491

PCT Pub. Date: Nov. 2, 1995

[51] Int. Cl.$^6$ .............. H01F 1/34; C01G 49/00; C04B 35/38
[52] U.S. Cl. ................... 252/62.56; 252/62.54; 252/62.62; 252/62.63
[58] Field of Search .............. 252/62.62, 62.59, 252/62.63, 62.56

[56] References Cited

U.S. PATENT DOCUMENTS 5,143,638  9/1992  Yamazaki et al. ............... 252/62.62

FOREIGN PATENT DOCUMENTS

| 60-137830 | 7/1985 | Japan . |
| 2-54902 | 2/1990 | Japan ................. 252/62.59 |
| 4-322410 | 11/1992 | Japan . |
| 5-170527 | 7/1993 | Japan . |
| 5-226138 | 9/1993 | Japan . |
| 5-243034 | 9/1993 | Japan . |
| 6-140231 | 5/1994 | Japan ................. 252/62.59 |

OTHER PUBLICATIONS

Database WPI, Derwent Publications, AN–93–371315, JP–A–05–267040, Oct. 15, 1993.
Database WPI, Derwent Publications, AN–91–371847, JP–A–03–248403, Nov. 6, 1991.

*Primary Examiner*—Melissa Bonner
*Attorney, Agent, or Firm*—Oblon, Spivak, McClelland, Maier & Neustadt, P.C.

[57] ABSTRACT

A ferrite having low power losses, high $\Delta B = Bm - Br$ at high frequency, and improved $\mu a$-B properties is provided as well as a core for a power supply using the same. The ferrite contains 30–41 mol % of MnO, 6–16 mol % of ZnO, and the balance of $Fe_2O_3$ as main components and 50–250 ppm of $SiO_2$, 200–1500 ppm of CaO, up to 4000 ppm of $SnO_2$, up to 3000 ppm of $TiO_2$, at least 300 ppm of $SnO_2+TiO_2$, from more than 0 to 500 ppm of $Nb_2O_5$, and from more than 0 to 400 ppm of $ZrO_2$ as subordinate components.

10 Claims, 1 Drawing Sheet

50μm

50μm

FERRITE AND FERRITE CORE FOR POWER SUPPLY

TECHNICAL FIELD

This invention relates to a manganese-zinc system ferrite for use as cores of electric power supplies, typically power supply transformers operating at a high frequency of about 10 to 500 kHz and a core for power supply constructed by the ferrite.

BACKGROUND ART

Manganese-zinc system ferrite is often used to form cores for use in coils and transformers of various communication equipment and commercial appliances. Since the recent trend is to use power supplies of higher frequency, core materials of performance meeting such purposes are now required. In particular, switching power supplies need transformers which operate at a power of several tens of watts and a high frequency band of 10 to 500 kHz. Also required are cores for transformers intended for motor drive, signal amplification and oscillation purposes. Transformer cores are conventionally formed of low-loss ferrites of manganese-zinc system. However, since the power loss also known as core loss is substantial in a high frequency region of 10 to 500 kHz, there is a demand for an improvement in core loss. Various proposals have been made in this respect.

Such proposals included addition of oxides of Si and Ca and further addition of oxides of tetravalent metals such as Sn, Ti and Zr as well as oxides of pentavalent metals such as V, Nb and Ta. Examples of the sole or combined addition of oxides of tetra- or pentavalent metals are found in Japanese Patent Application Kokai (JP-A) Nos. 2880/1971, 72696/1973, 262404/1985, 108109/1986, 252609/1986, 252611/1986, 222018/1988, 129403/1989, 54902/1990, 141611/1991, 163804/1991, 223119/1991, 248403/1991, 248404/1991, 248405/1991, 254103/1991, 55362/1992, 150007/1992, 198416/1993, 267040/1993, etc.

These proposals, however, fail to increase the difference between maximum magnetic flux density Bm and residual magnetic flux density Br, $\Delta B=Bm-Br$, at a high frequency of e.g., 100 kHz and 100° C., to reduce the power loss at the high frequency, and to increase effective magnetic permeability ($\mu a$) associated with a $\mu a$-B curve. As a consequence, when transformers are formed of these conventional ferrites, it is difficult to reduce the size of transformers.

DISCLOSURE OF THE INVENTION

An object of the present invention is to provide a ferrite having a low power loss as well as large $\Delta B=Bm-Br$ at high frequency and an improved $\mu a$-B curve and a core for a power supply using the same.

This and other objects are achieved by the present invention which is defined below as (1) to (11).

(1) A ferrite characterized by comprising manganese oxide, zinc oxide, and iron oxide as main components, and silicon oxide, calcium oxide, tin oxide and/or titanium oxide, niobium oxide, and zirconium oxide as subordinate components, wherein in the main components, the content of manganese oxide is 30 to 41 mol % calculated as MnO and the content of zinc oxide is 6 to 16 mol % calculated as ZnO, and the weight proportion of the subordinate components based on the main components is such that silicon oxide is 50 to 250 ppm calculated as $SiO_2$, calcium oxide is 200 to 1,500 ppm calculated as CaO, tin oxide is up to 4,000 ppm calculated as $SnO_2$, titanium oxide is up to 3,000 ppm calculated as $TiO_2$, and the total of tin oxide and titanium oxide is at least 300 ppm, niobium oxide is from more than 0 to 500 ppm calculated as $Nb_2O_5$, and zirconium oxide is from more than 0 to 400 ppm calculated as $ZrO_2$.

(2) The ferrite of (1) wherein the content of niobium oxide based on the main components is at least 50 ppm calculated as $Nb_2O_5$ and the content of zirconium oxide based on the main components is at least 50 ppm calculated as $ZrO_2$.

(3) The ferrite of (1) or (2) wherein the content of niobium oxide based on the main components is 100 to 400 ppm calculated as $Nb_2O_5$.

(4) The ferrite of any one of (1) to (3) wherein the weight ratio of P based on the main components is 0 to 30 ppm.

(5) The ferrite of any one of (1) to (4) wherein the weight ratio of B based on the main components is 0 to 50 ppm.

(6) The ferrite of any one of (1) to (5) which has a power loss of up to 300 kW/m$^3$ at a temperature of 100° C. when an AC magnetic field of 100 kHz and 200 mT is applied.

(7) The ferrite of (6) which has an eddy current loss of up to 200 kW/m$^3$ at a temperature of 100° C. when an AC magnetic field of 100 kHz and 200 mT is applied.

(8) The ferrite of any one of (1) to (7) wherein when an AC magnetic field of 100 kHz is applied at a temperature of 100° C., the resulting hysteresis curve has a $\Delta B$ value of at least 220 mT wherein $\Delta B=Bm-Br$ wherein Bm and Br are maximum magnetic flux density and residual magnetic flux density, respectively.

(9) The ferrite of any one of (1) to (8) wherein when an AC magnetic field of 100 kHz is applied at a temperature of 100° C., the resulting hysteresis curve has an effective magnetic permeability $\mu a$ of at least 5,000 at magnetization B=200 mT and an effective magnetic permeability $\mu a$ of at least 4,500 at magnetization B=300 mT.

(10) The ferrite of any one of (1) to (9) which has a residual magnetic flux density Br of up to 140 mT as measured in a DC magnetic field at a temperature of 25° C. or a $\Delta B$ value of at least 380 mT wherein $\Delta B=Bm-Br$ wherein Bm and Br are maximum magnetic flux density and a residual magnetic flux density, respectively, as measured in a DC magnetic field at a temperature of 25° C.

(11) A ferrite core for use in an electric power supply, characterized by comprising the ferrite of any one of (1) to (10).

FUNCTION AND BENEFITS OF THE INVENTION

Since the manganese-zinc system ferrite of the present invention contains predetermined amounts of silicon oxide, calcium oxide, tin oxide and/or titanium oxide, niobium oxide, and zirconium oxide, it is minimized in power loss and increased in $\Delta B$ in a relatively high frequency region (for example, of 10 to 500 kHz). The ferrite is then useful to form cores in transformers required to produce an output of several watts to several tens of watts as in business machines. Since the ferrite has an improved $\mu a$-B curve and a high $\mu a$ value, transformers for power supplies can be reduced in size. These advantages are available over a wide temperature range while a fully low power loss is maintained at a practical service temperature of about 80° to 110° C.

Although some of the above-cited patent publications disclose subordinate compounds as used in the present invention, none of them disclose specific combinations falling within the scope of the invention.

For example, JP-A 198416/1993 discloses a Mn—Zn system ferrite which is based on a base component consisting of $Fe_2O_3$, MnO and ZnO and contains as subordinate components SiC, CaO and at least one member selected from the group consisting of niobium oxide, titanium oxide, antimony oxide, tantalum oxide, vanadium oxide, zirconium oxide, tin oxide, aluminum oxide, cobalt oxide, copper oxide, hafnium oxide, and silicon oxide. This patent publication, however, lacks the description that addition of silicon oxide, calcium oxide, tin oxide and/or titanium oxide, niobium oxide, and zirconium oxide is essential, and none of Examples disclosed therein show the combined addition of these oxides. In Examples disclosed therein, low losses are available when certain subordinate components are added although no reference is made to Bm, Br, and ΔB at high frequency and DC as well as to effective magnetic permeability ($\mu$a).

JP-A 267040/1993 discloses a Mn—Zn system ferrite which is based on a base component consisting of $Fe_2O_3$, MnO and ZnO and contains as subordinate components $Si_3N_4$, CaO and at least one member selected from the group consisting of niobium oxide, titanium oxide, antimony oxide, tantalum oxide, zirconium oxide, tin oxide, cobalt oxide, and silicon oxide. This patent publication, however, lacks the description that addition of silicon oxide, calcium oxide, tin oxide and/or titanium oxide, niobium oxide, and zirconium oxide is essential, and none of Examples disclosed therein show the combined addition of these oxides. In Examples disclosed therein, low losses are available when certain subordinate components are added although no reference is made to Bm, Br, and ΔB at high frequency and DC as well as to effective magnetic permeability ($\mu$a).

ILLUSTRATIVE EMBODIMENTS

Figure 1:
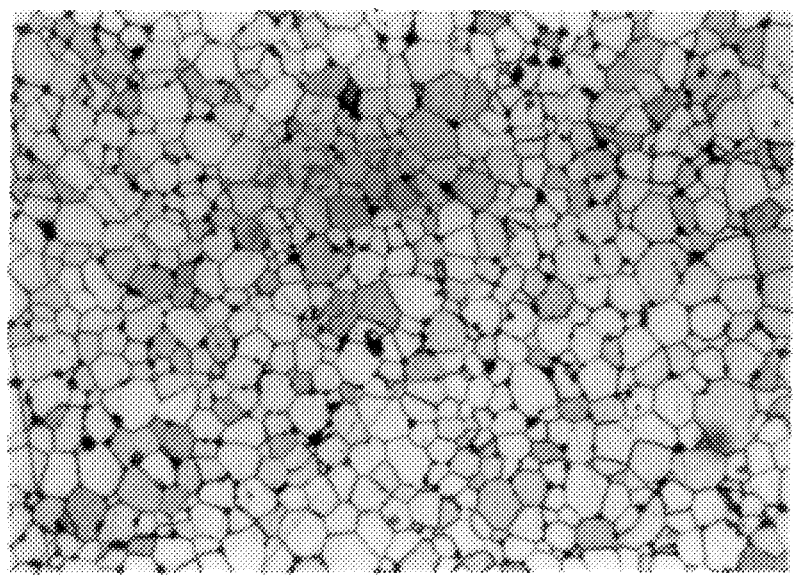
FIG. 1 is a crystalline structure photograph substituting for drawing, showing a cross section of a ferrite core under an optical microscope.

Now, the illustrative embodiments of the present invention are described in detail. The manganese-zinc system ferrite of the present invention contains manganese oxide, zinc oxide, and iron oxide as main components, and silicon oxide, calcium oxide, tin oxide and/or titanium oxide, niobium oxide, and zirconium oxide as subordinate components.

With respect to the content of the respective oxides in the main components, manganese oxide is 30 to 41 mol %, preferably 33 to 41 mol % calculated as MnO, zinc oxide is 6 to 16 mol %, preferably 6 to 12 mol % calculated as ZnO, and the balance consists of iron oxide. Outside this range, there result increased power losses, a minimum temperature of lower than 60° C., a Curie point of lower than 200° C., lowering of Bm and initial magnetic permeability ($\mu$i) in the high frequency region, or increased Br.

The weight proportion of the subordinate components based on the main components is as follows.

Silicon oxide is 50 to 250 ppm, preferably 70 to 200 ppm calculated as $SiO_2$. Calcium oxide is 200 to 1,500 ppm, preferably 300 to 1,000 ppm calculated as CaO. By adding silicon oxide and calcium oxide in these ranges, there are achieved a reduction of Br, an increase of ΔB (=Bm−Br), a reduction of power loss, an increase of Q value, and an improvement in $\mu$a-B curve.

Tin oxide is up to 4,000 ppm calculated as $SnO_2$, and titanium oxide is up to 3,000 ppm calculated as $TiO_2$. The total of tin oxide and titanium oxide is at least 300 ppm, preferably at least 500 ppm. Preferred are those containing 500 to 4,000 ppm of tin oxide wherein the tin oxide is contained alone or wherein up to 90% by weight of the tin oxide is replaced by titanium oxide. By adding at least one of tin oxide and titanium oxide in these ranges, there are achieved a reduction of Br, an increase of ΔB, a reduction of power loss, and an improvement in $\mu$a-B curve, allowing for size reduction of cores.

Niobium oxide is from more than 0 to 500 ppm calculated as $Nb_2O_5$, and is preferably up to 400 ppm and at least 50 ppm, more preferably at least 100 ppm. Zirconium oxide is from more than 0 to 400 ppm calculated as $ZrO_2$, and is preferably at least 50 ppm. By adding niobium oxide and zirconium oxide in these ranges, there are achieved a critical reduction of power loss, a reduction of Br, an increase of ΔB, and an improvement in $\mu$a-B curve.

In addition to these subordinate components, the ferrite of the present invention may contain trace additive elements and impurity elements originating from raw materials. Such elements include P, B, Al, Co, Cu, Li, Na, K, In, Bi, etc. To suppress their influence on power loss and magnetic properties, the weight proportion of these elements based on the main components should preferably be up to 200 ppm (0 to 200 ppm). In particular, since P and B have a great influence on power loss and magnetic properties, the weight proportion of P based on the main components should preferably be 0 to 30 ppm, more preferably 0 to 20 ppm, most preferably 0 to 10 ppm, and the weight proportion of B based on the main components should preferably be 0 to 50 ppm, more preferably 0 to 30 ppm. This leads to improvements in Br, ΔB, $\mu$a and loss.

The ferrite of the invention preferably has an average crystal grain size of 10 to 30 $\mu$m, more preferably 10 to 20 $\mu$m. A smaller average grain size would lead to an increased hysteresis loss whereas a larger average grain size would lead to an increased eddy current loss.

The ferrite of the invention can have a power loss of up to 300 $kW/m^3$, especially up to 260 $kW/m^3$ at a temperature of 100° C. when a sinusoidal AC magnetic field (maximum 200 mT) of 100 kHz is applied. Among the power losses, the eddy current loss can be reduced to 200 $kW/m^3$ or less, especially 170 $kW/m^3$ or less. While the hysteresis loss is proportional to a frequency and the eddy current loss is proportional to the square of a frequency, the ferrite of the invention has the advantage that no substantial increase of power loss occurs even in a high frequency region in excess of 100 kHz because the eddy current loss at 100 kHz is relatively small.

Also the ferrite of the invention follows a hysteresis curve when a sinusoidal AC magnetic field of 100 kHz is applied at a temperature of 100° C. The hysteresis curve has Bm of at least 350 mT, Br of up to 170 mT, especially up to 150 mT, and ΔB=Bm−Br of at least 220 mT, often at least 250 mT, especially at least 280 mT. Its coercivity Hc is generally up to 20 A/m, often up to 14 A/m, especially up to 13 A/m.

Further the ferrite of the invention has Br of up to 140 mT or ΔB of at least 380 mT as measured in a DC magnetic field at 25° C. It also has Bm of at least 520 mT and Hc of up to 12.5 A/m, especially up to 12.0 A/m.

A smaller value of Br or a larger value of ΔB leads to a wider unsaturation region which enables use at greater power and which is advantageous for minor loop driving when mounted as a core.

Also the ferrite of the invention follows a hysteresis curve when a sinusoidal AC magnetic field of 100 kHz is applied at a temperature of 100° C. The hysteresis curve has an effective magnetic permeability $\mu a$ of at least 5,000, especially at least 5,200 and generally up to about 7,000 at magnetization B=200 mT. The effective magnetic permeability $\mu a$ at magnetization B=300 mT is at least 4,500, often at least 4,800, especially at least 5,500 and generally up to about 7,000. These allow cores to be significantly reduced in size as compared with conventional cores.

From the ferrite of the invention there may be formed cores for use in electric power supply transformers which will operate at a frequency of 10 to 500 kHz and a temperature of about 80° to 110° C. while their power is generally about 1 to 100 W.

The ferrite and power supply-forming ferrite core according to the invention are manufactured by the methods mentioned below.

Raw materials used for the main components are powder oxides or powder compounds which convert into oxides by heating. For example, iron oxide powder, manganese oxide powder, manganese carbonate powder, zinc oxide powder, etc. may be used. They are mixed and calcined and the calcined mixture is finely divided to a mean particle size of about 1 to 3 $\mu m$. Calcining may be effected in air at a predetermined temperature in the range of 800 to 1,000° C.

Raw materials used for the subordinate components are powder oxides or powder compounds which convert into oxides by heating. In some cases, powders of metal elements which are members of the subordinate components may be used.

The mixing ratio of the main components to the subordinate components should correspond to the final composition. Raw materials of the main components and raw materials of the subordinate components may be mixed before or after calcination.

Raw materials of the main components are not limited to the above-mentioned ones and a powder of a composite oxide containing two or more metals may be used as a main component raw material. Such composite oxide powder is generally prepared by oxidizing and roasting chlorides. For example, a powder of a composite oxide containing Fe, Mn and Zn can be prepared by oxidizing and roasting an aqueous solution containing iron chloride, manganese chloride and zinc chloride. This composite oxide generally contains a spinel phase. It is noted that since zinc chloride has a high vapor pressure, a compositional shift often occurs. An alternative method is then to form a main component raw material by preparing a powder of a composite oxide containing Fe and Mn from an aqueous solution of iron chloride and manganese chloride and mixing the powder with a zinc oxide powder or zinc ferrite powder. When the composite oxide powder resulting from the oxidation roasting process is used as a main component raw material, it is unnecessary to carry out calcination.

Thereafter, a mixture of main component raw materials and subordinate component raw materials is combined with a small amount of a suitable binder such as polyvinyl alcohol and atomized into particles having a particle size of about 80 to 200 $\mu m$ by means of a spray dryer or the like. The particles are then compacted and the compact is fired in an atmosphere having a controlled oxygen concentration and at a temperature in the range of 1,250° to 1,400° C., obtaining a ferrite.

EXAMPLE

Examples of the present invention are given below by way of illustration.

Ferrite core samples having the composition shown in Table 1 were prepared. First, calcined raw materials of the main components and raw materials of the subordinate components were mixed. The raw materials used for the main components were $Fe_2O_3$, $Mn_3O_4$ and ZnO, which were mixed and calcined at 900° C. for 3 hours. The raw materials used for the subordinate components were $SiO_2$, CaCO3, $SnO_2$, $TiO_2$, $Nb_2O_5$ an d $ZrO_2$. The raw materials of the subordinate components were added to the calcined raw materials of the main components and they were mixed while pulverizing. The calcined material was pulverized until a mean particle size of about 2 $\mu m$ was reached. The resulting mixture was combined with a binder and atomized into particles having a mean particle size of 150 $\mu m$ by a spray dryer. The particles were compacted and fired in an atmosphere having a controlled oxygen partial pressure at 1,300° C. for 5 hours, obtaining a toroidal sample having an outer diameter of 31 mm, an inner diameter of 19 mm, and a height of 8 mm. The samples were measured for proportion of constituent elements by fluorescent X-ray analysis. The proportion of constituent elements was the same as the raw material composition. It is noted that the content of P in Table 1 was measured by absorptiometry. The samples was measured for boron content by ICP, finding a B content of up to 30 ppm in all the samples. It is noted that P and B originated from the starting oxides such as iron oxide.

With a sinusoidal AC magnetic field of 100 kHz and 200 mT (maximum) applied, each sample was measured for hysteresis loss (Phv), eddy current loss (Pev), and core loss (Pcv) at 100° C. The results are shown in Table 2. It is to be noted that there is a general relationship:

formula I: Pcv=Phv+Pev+Prv wherein Prv is a residual loss. The respective terms are:

Phv=α×f

Pev=β×f²

Prv=γ wherein f is a driving frequency, and α, β and γ are constants. This gives the following.

formula II: Pcv=αxf+βXf²+γ

Dividing the equation by f gives the following.

formula III: Pcv/f=βxf+α+γ/f

If γ is sufficiently small, formula III can be approximated to a linear expression of f. Since the ferrites used in the respective samples had a sufficiently small value of γ in a frequency zone of 25 to 500 kHz, Pcv=Phv+Pev is assumed in Table 2.

From a hysteresis curve of each sample obtained when a sinusoidal AC magnetic field of 100 kHz was applied at a temperature of 100° C., values of Br, Hc and ΔB=Bm−Br were determined. From the hysteresis curve, $\mu a$ at magnetization B=200 mT and $\mu a$ at magnetization B=300 mT were determined. Also under an applied DC magnetic field, values of Br, Hc and ΔB=Bm−Br at 25° C. were determined. The results are shown in Table 2.

TABLE 1

| Sample No. | Main component(mol %) | | | Subordinate component | | | | | | P (ppm) |
|---|---|---|---|---|---|---|---|---|---|---|
| | Fe₂O₃ | MnO | ZnO | SiO₂ | CaO | SnO₂ | TiO₂ | Nb₂O₅ | ZrO₂ | |
| 1 (comparison) | 53.5 | 36.5 | 10.0 | 130 | 450 | 2000 | 0 | 0** | 0** | 5 |
| 2 (comparison) | 53.5 | 36.5 | 10.0 | 130 | 450 | 2000 | 0 | 300 | 0** | 5 |
| 3 (comparison) | 53.5 | 36.5 | 10.0 | 130 | 450 | 2000 | 0 | 600** | 0** | 5 |
| 4 | 53.5 | 36.5 | 10.0 | 130 | 450 | 2000 | 0 | 300 | 20* | 5 |
| 5 | 53.5 | 36.5 | 10.0 | 130 | 450 | 2000 | 0 | 300 | 70 | 5 |
| 6 (comparison) | 53.5 | 36.5 | 10.0 | 130 | 450 | 2000 | 0 | 0** | 100 | 5 |
| 7 | 53.5 | 36.5 | 10.0 | 130 | 450 | 2000 | 0 | 150 | 100 | 5 |
| 8 | 53.5 | 36.5 | 10.0 | 130 | 450 | 2000 | 0 | 300 | 100 | 5 |
| 9 | 53.5 | 36.5 | 10.0 | 130 | 450 | 2000 | 0 | 20* | 200 | 5 |
| 10 | 53.5 | 36.5 | 10.0 | 130 | 450 | 2000 | 0 | 70 | 200 | 5 |
| 11 | 53.5 | 36.5 | 10.0 | 130 | 450 | 2000 | 0 | 150 | 200 | 5 |
| 12 | 53.5 | 36.5 | 10.0 | 130 | 450 | 2000 | 0 | 300 | 200 | 5 |
| 13 | 53.5 | 36.5 | 10.0 | 130 | 450 | 2000 | 0 | 450* | 200 | 5 |
| 14 (comparison) | 53.5 | 36.5 | 10.0 | 130 | 450 | 2000 | 0 | 600** | 200 | 5 |
| 15 | 53.5 | 36.5 | 10.0 | 130 | 450 | 2000 | 0 | 150 | 250 | 5 |
| 16 | 53.5 | 36.5 | 10.0 | 130 | 450 | 2000 | 0 | 300 | 250 | 5 |
| 17 | 53.5 | 36.5 | 10.0 | 130 | 450 | 2000 | 0 | 450* | 250 | 5 |
| 18 (comparison) | 53.5 | 36.5 | 10.0 | 130 | 450 | 2000 | 0 | 0** | 300 | 5 |
| 19 | 53.5 | 36.5 | 10.0 | 130 | 450 | 2000 | 0 | 150 | 300 | 5 |
| 20 | 53.5 | 36.5 | 10.0 | 130 | 450 | 2000 | 0 | 300 | 300 | 5 |
| 21 | 53.5 | 36.5 | 10.0 | 130 | 450 | 2000 | 0 | 450* | 300 | 5 |
| 22 | 53.5 | 36.5 | 10.0 | 130 | 450 | 2000 | 0 | 150 | 350 | 5 |
| 23 | 53.5 | 36.5 | 10.0 | 130 | 450 | 2000 | 0 | 300 | 350 | 5 |
| 24 (comparison) | 53.5 | 36.5 | 10.0 | 130 | 450 | 2000 | 0 | 0** | 500** | 5 |
| 25 (comparison) | 53.5 | 36.5 | 10.0 | 130 | 450 | 2000 | 0 | 100 | 500** | 5 |
| 26 (comparison) | 53.5 | 36.5 | 10.0 | 130 | 450 | 2000 | 0 | 200 | 500** | 5 |
| 27 (comparison) | 53.5 | 36.5 | 10.0 | 130 | 450 | 2000 | 0 | 300 | 500** | 5 |
| 28 | 53.5 | 36.5 | 10.0 | 130 | 450 | 0 | 1700 | 300 | 200 | 5 |
| 29 | 53.5 | 36.5 | 10.0 | 130 | 450 | 2000 | 0 | 300 | 200 | 15 |
| 30 | 53.5 | 36.5 | 10.0 | 130 | 450 | 2000 | 0 | 300 | 200 | 25 |
| 31 | 53.5 | 36.5 | 10.0 | 130 | 450 | 2000 | 0 | 300 | 200 | 35* |
| 32 (comparison) | 53.5 | 35.0 | 11.5 | 130 | 450 | 0** | 0** | 300 | 200 | 5 |

**outside the range of the invention
*outside the preferred range

TABLE 2

| Sample No. | Power loss (kW/m³) | | | 100 kHz, 100° C. | | | DC, 25° C. | | | μa 100 kHz, 100° C. | |
|---|---|---|---|---|---|---|---|---|---|---|---|
| | Pcv | Phv | Pev | Br (mT) | ΔB (mT) | Hc (A/m) | Br (mT) | ΔB (mT) | Hc (A/m) | 200 mT | 300 mT |
| 1 (comparison) | 332** | 121 | 211** | 182** | 222* | 14.6* | 161** | 366** | 12.9** | 6250 | 5670 |
| 2 (comparison) | 278* | 108 | 170 | 165* | 248* | 13.8 | 145** | 395 | 12.2* | 5330 | 4940 |
| 3 (comparison) | 326** | 133 | 194** | 171** | 246* | 15.3* | 128 | 417 | 12.1* | 5120* | 4760* |
| 4 | 270* | 103 | 167 | 160* | 243* | 13.6 | 140 | 390 | 12.0 | 5340 | 4990 |
| 5 | 245 | 87 | 158 | 120 | 307 | 12.9 | 125 | 421 | 11.8 | 5340 | 5050 |
| 6 (comparison) | 320** | 116 | 204** | 159* | 257 | 14.5* | 158** | 372** | 12.4* | 6250 | 5810 |
| 7 | 259 | 98 | 161 | 121 | 302 | 12.9 | 151** | 390 | 12.3* | 5800 | 5540 |
| 8 | 240 | 84 | 156 | 111 | 316 | 12.7 | 120 | 426 | 11.7 | 5350 | 5100 |
| 9 | 309** | 109 | 200* | 147 | 268 | 14.3* | 149** | 380 | 12.2* | 6100 | 5650 |
| 10 | 273* | 94 | 179* | 130 | 285 | 13.3 | 147** | 386 | 12.3* | 5900 | 5550 |
| 11 | 249 | 87 | 162 | 115 | 305 | 12.8 | 134 | 404 | 12.5* | 5700 | 5430 |
| 12 | 230 | 73 | 157 | 100 | 324 | 12.1 | 123 | 419 | 12.0 | 5210 | 4960 |
| 13 | 256 | 76 | 180* | 103 | 325 | 12.9 | 120 | 424 | 11.9 | 4950** | 4660* |
| 14 (comparison) | 360** | 170 | 190* | 110 | 310 | 15.0* | 110 | 430 | 12.0 | 4800** | 4500* |
| 15 | 258 | 85 | 174** | 123 | 296 | 12.8 | 134 | 400 | 11.8 | 5780 | 5390 |
| 16 | 234 | 69 | 165 | 112 | 311 | 12.2 | 117 | 422 | 11.5 | 5280 | 4980 |
| 17 | 263* | 88 | 175* | 108 | 319 | 13.4 | 113 | 431 | 11.5 | 4940** | 4630* |
| 18 (comparison) | 327** | 115 | 211** | 155* | 258 | 15.1* | 141** | 386 | 11.9 | 6150 | 5650 |
| 19 | 242 | 77 | 165 | 122 | 298 | 13.4 | 130 | 406 | 11.7 | 5680 | 5360 |
| 20 | 230 | 72 | 158 | 100* | 309 | 12.7 | 103 | 431 | 10.5 | 5060* | 4810 |
| 21 | 281* | 105 | 176* | 103 | 321 | 13.9 | 114 | 429 | 12.3* | 4750** | 4470** |
| 22 | 237 | 77 | 160 | 112 | 309 | 12.7 | 129 | 407 | 12.0 | 5560 | 5270 |
| 23 | 240 | 76 | 163 | 102 | 321 | 12.8 | 114 | 426 | 11.6 | 5050* | 4770* |
| 24 (comparison) | 416** | 164 | 252** | 169* | 240* | 16.9* | 125 | 398 | 12.3* | 5960 | 5220 |
| 25 (comparison) | 405** | 170 | 235** | 108 | 306 | 13.7 | 115 | 409 | 12.6** | 5110* | 4910 |
| 26 (comparison) | 435** | 195 | 240** | 114 | 303 | 14.7* | 110 | 419 | 13.0** | 4520** | 4350** |
| 27 (comparison) | 425** | 225 | 200* | 157* | 272 | 19.2* | 125 | 419 | 13.7** | 4180** | 4020** |
| 28 | 241 | 76 | 164 | 110 | 309 | 12.9 | 109 | 427 | 11.1 | 5160* | 4820 |
| 29 | 266* | 112 | 154 | 110 | 313 | 13.6 | 135 | 408 | 13.5** | 4990** | 4770* |

TABLE 2-continued

| Sample | Power loss (kW/m³) | | | 100 kHz, 100° C. | | | DC, 25° C. | | | μa 100 kHz, 100° C. | |
|---|---|---|---|---|---|---|---|---|---|---|---|
| | | | | Br | ΔB | Hc | Br | ΔB | Hc | | |
| No. | Pcv | Phv | Pev | (mT) | (mT) | (A/m) | (mT) | (mT) | (A/m) | 200 mT | 300 mT |
| 30 | 281* | 120 | 161 | 111 | 310 | 14.0 | 140 | 408 | 14.2** | 4960** | 4730* |
| 31 | 295* | 131 | 164 | 116 | 303 | 14.3* | 141** | 399 | 14.3** | 4940** | 4710* |
| 32 (comparison) | 288* | 103 | 185* | 180** | 205** | 13.3 | 160 | 356** | 13.2** | 5730 | 5460 |

Figure 2:
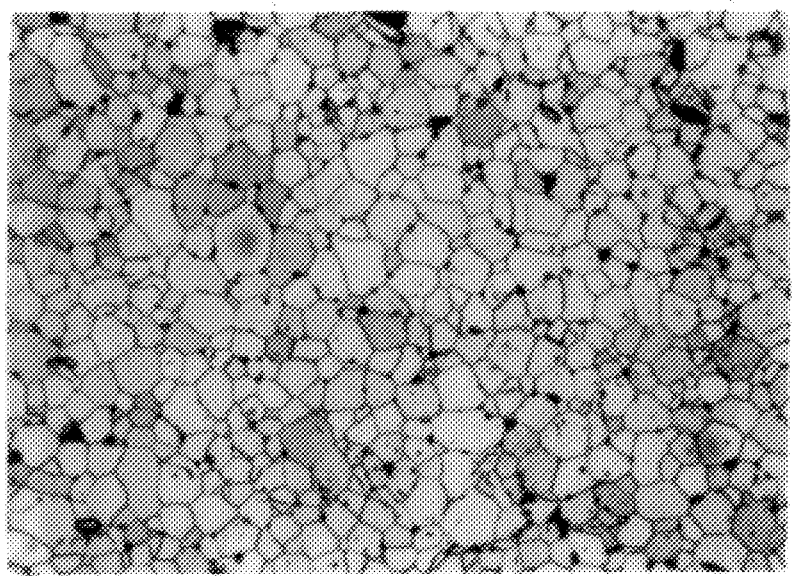
FIG. 2 is a crystalline structure photograph substituting for drawing, showing a cross section of a ferrite core under an optical microscope.

**outside the preferred range
*outside the more preferred range
Pcv: core loss (100 kHz, 200 mT, 100° C.)
Phv: hysteresis loss (100 kHz, 200 mT, 100° C.)
Pev: eddy current loss (100 kHz, 200 mT, 100° C.)
ΔB = Bm − Br The samples had a mean grain size of 10 to 15 μm. FIG. 1 is a photograph under an optical microscope of a cross section of sample No. 1. FIG. 2 is a photograph under an optical microscope of a cross section of sample No. 12. FIGS. 1 and 2 show that both the samples have an approximate crystal grain shape and approximately equal mean grain size.

As shown in Table 2, the inventive samples are low in both hysteresis loss and eddy current loss and hence, low in core loss. In general, the hysteresis loss decreases as the grain size increases; and the eddy current loss decreases as the grain size decreases. A comparison between FIGS. 1 and 2 reveals that the loss reduction in the inventive samples does not depend on grain size.

Further, the inventive samples have high Hc and high ΔB so that they may be used at high power. They also have good μa-B properties, and as a result, power supply transformers can be reduced in size and power supplies using the same can be increased in efficiency. More particularly, the core size can be made very small. The improved efficiency allows for a lower input power and a reduced number of windings. While the operating power is limited by the heat release which in turn, varies depending on input power and core configuration, the core according to the invention allows the input power to be increased because of reduced power losses.

It was found in connection with sample No. 12 that the core loss (especially eddy current loss) increased when the weight proportion of silicon oxide was less than 50 ppm based on the main components, and that the core loss also increased when the weight proportion of silicon oxide was more than 250 ppm. The core loss (especially eddy current loss) increased, Br increased and ΔB decreased when the weight proportion of calcium oxide was less than 200 ppm based on the main components, and the core loss also increased when the weight proportion of calcium oxide was more than 1,500 ppm. Moreover, the temperature at which the core loss was minimized was below 60° C. when the weight proportion of tin oxide was more than 4,000 ppm based on the main components and when more than 3,000 ppm of titanium oxide was added without adding tin oxide.

It was also found in connection with sample No. 12 that when a mixture of tin oxide and titanium oxide was used instead of tin oxide alone, there were obtained equivalent properties to sample No. 12.

We claim:

1. A ferrite characterized by comprising
   manganese oxide, zinc oxide, and iron oxide as main components, and
   silicon oxide, calcium oxide, tin oxide and/or titanium oxide, niobium oxide, and zirconium oxide as subordinate components, wherein
   in the main components, the content of manganese oxide is 30 to 41 mol % calculated as MnO and the content of zinc oxide is 6 to 16 mol % calculated as ZnO, and
   the weight proportion of the subordinate components based on the main components is such that
   silicon oxide is 50 to 250 ppm calculated as $SiO_2$,
   calcium oxide is 200 to 1,500 ppm calculated as CaO,
   tin oxide is up to 4,000 ppm calculated as $SnO_2$, titanium oxide is up to 3,000 ppm calculated as $TiO_2$, and the total of tin oxide and titanium oxide is at least 300 ppm,
   niobium oxide is from more than 0 to 550 ppm calculated as $Nb_2O_5$, and
   zirconium oxide is from more than 0 to 400 ppm calculated as $ZrO_2$,
   P is present in a weight ratio of 5 to 35 ppm based on the main component, and
   the remainder iron oxide.

2. The ferrite of claim 1 wherein the content of niobium oxide based on the main components is at least 50 ppm calculated as $Nb_2O_5$ and the content of zirconium oxide based on the main components is at least 50 ppm calculated as $ZrO_2$.

3. The ferrite of claim 1 wherein the content of niobium oxide based on the main components is 100 to 400 ppm calculated as $Nb_2O_5$.

4. The ferrite of claim 1 wherein the weight ratio of B based on the main components is 0 to 50 ppm.

5. The ferrite of claim 1 which has a power loss of up to 300 kW/m³ at a temperature of 100° C. when an AC magnetic field of 100 kHz and 200 mT is applied.

6. The ferrite of claim 5 which has an eddy current loss of up to 200 kW/m³ at a temperature of 100° C. when an AC magnetic field of 100 kHz and 200 mT is applied.

7. The ferrite of claim 1 wherein when an AC magnetic field of 100 kHz is applied at a temperature of 100° C., the resulting hysteresis curve has a ΔB value of at least 220 mT wherein ΔB=Bm−Br wherein Bm and Br are maximum magnetic flux density and residual magnetic flux density, respectively.

8. The ferrite of claim 1 wherein when an AC magnetic field of 100 kHz is applied at a temperature of 100° C., the resulting hysteresis curve has an effective magnetic permeability μa of at least 5,000 at magnetization B=200 mT and an effective magnetic permeability μa of at least 4,500 at magnetization B=300 mT.

9. The ferrite of claim 1 which has a residual magnetic flux density Br of up to 140 mT as measured in a DC magnetic field at a temperature of 25° C. or a ΔB value of at least 380 mT wherein ΔB=Bm−Br wherein Bm and Br are maximum magnetic flux density and a residual magnetic flux density, respectively, as measured in a DC magnetic field at a temperature of 25° C.

10. A ferrite core for use in an electric power supply, characterized by comprising the ferrite of claim 1.

* * * * *